Aug. 25, 1925.  J. DONOGHUE  1,551,470

VEHICLE WHEEL

Filed June 29, 1925

INVENTOR

J. Donoghue

ATTORNEY

Patented Aug. 25, 1925.

1,551,470

UNITED STATES PATENT OFFICE.

JAMES DONOGHUE, OF LLANELLY, ENGLAND.

VEHICLE WHEEL.

Application filed June 29, 1925. Serial No. 40,334.

*To all whom it may concern:*

Be it known that I, JAMES DONOGHUE, a subject of the King of Great Britain, residing at Llanelly, in the county of Carmarthen, England, have invented certain new and useful Improvements in Vehicle Wheels, of which the following is a specification.

My invention relates to pneumatic-tired vehicle wheels of the type in which a cover is superposed over the casing of a pneumatic tire.

The object of my invention is to provide an improved form of wheel of the type indicated above.

My invention consists in a wheel of the type indicated in which the cover is retained in position by discs disposed one on each side of the wheel.

Figure 1:
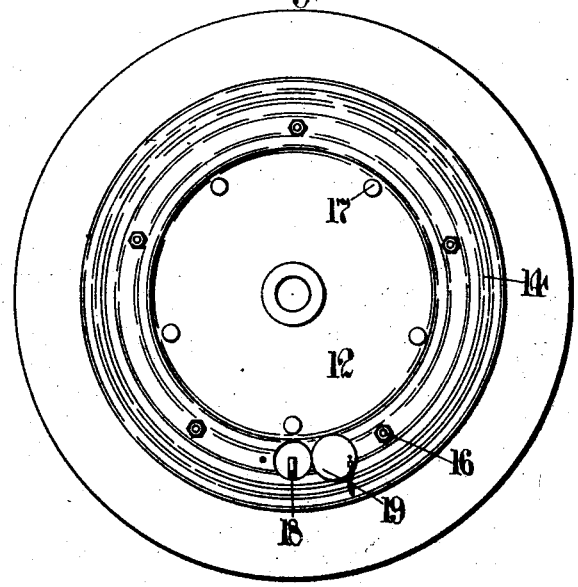
Figure 2:
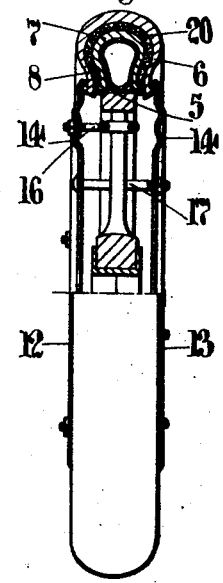

Referring now to the accompanying drawings,

Figures 1 and 2 show a side elevation and a sectional elevation of a wheel fitted with retaining devices according to my invention.

In carrying my invention into effect, I select for the cover to be superposed on the pneumatic tire wheel, any suitable form of cover, the internal dimensions of which correspond to the external dimensions of the tire casing upon which it is to be superposed.

In Figures 1 and 2, I have shown an arrangement for retaining the tire and superposed tire covers in position on a vehicle wheel.

In this example the rim, 5, of the wheel is flattened to facilitate the application or the removal of the tire.

The cover, 6, of the wheel after being expanded, is slipped over the casing, 7, the inner tube, 8, of which has first been deflated.

The tire is then secured in position by the discs, 12 and 13, arranged one on each side of the wheel.

These discs are formed with a number of corrugations for stiffening purposes, the outer corrugation being arranged to accommodate the beaded edge of the cover, 6.

The disc, 12 is secured to the spokes, 15, of the wheel by a number of clip bolts, 16, and the disc, 13, is secured to the disc, 12, by the bolts, 17.

A hole, 18, provided with a cover, 19, is formed in the disc, 12, to permit of access to the tire valves.

Also, if desired, a reinforcing strip of metal or wire mesh, 20, may be inserted between the covers, 6 and 7.

By means of my invention, it will be seen that a tire cover may be readily superposed and effectually held in position on new or existing pneumatic tire vehicle wheels so as to afford additional protection against punctures or bursts.

Further, a damaged casing may be conveniently reinforced by superposing an undamaged cover thereon and thereby materially prolong the life of the damaged tire without the necessity of repairing it, or a damaged cover may be used with a damaged casing, the damaged portions being staggered relatively to one another.

Partly worn or discarded tires may thus be efficiently employed on the wheels of vehicles.

I claim:—

The combination of a vehicle wheel having spokes extending between the hub and rim thereof, a casing and inner tube disposed on said wheel, a cover disposed on said casing together with discs disposed on opposite sides of said wheel for retaining said cover, one of said discs being attached to the spokes of said wheel and the other of said discs to the first of said discs, as set forth.

In testimony whereof I have signed my name to this specification.

JAMES DONOGHUE.